(12) United States Patent
Altonen et al.

(10) Patent No.: US 9,610,721 B2
(45) Date of Patent: Apr. 4, 2017

(54) REDUCED SIZE RUNNER FOR AN INJECTION MOLD SYSTEM

(71) Applicant: IMFLUX INC, Hamilton, OH (US)

(72) Inventors: Gene Michael Altonen, West Chester, OH (US); Vincent Sean Breidenbach, Lebanon, OH (US); Kimberly Nichole McConnell, Morrow, OH (US); Danny David Lumpkin, Cincinnati, OH (US); Chow-Chi Huang, West Chester, OH (US); Charles John Berg, Jr., Wyoming, OH (US)

(73) Assignee: IMFLUX INC, Hamilton, OH (US)

( * ) Notice: Subject to any disclaimer, the term of this patent is extended or adjusted under 35 U.S.C. 154(b) by 0 days.

(21) Appl. No.: 14/177,464

(22) Filed: Feb. 11, 2014

(65) Prior Publication Data

US 2014/0154352 A1 Jun. 5, 2014

Related U.S. Application Data

(62) Division of application No. 14/086,356, filed on Nov. 21, 2013, now abandoned.

(60) Provisional application No. 61/729,028, filed on Nov. 21, 2012.

(51) Int. Cl.
*B29C 45/27* (2006.01)
*B29C 45/77* (2006.01)
*B29L 31/00* (2006.01)
*B29L 31/30* (2006.01)

(52) U.S. Cl.
CPC ...... *B29C 45/2701* (2013.01); *B29C 45/2704* (2013.01); *B29C 45/77* (2013.01); *B29C 45/2708* (2013.01); *B29C 2045/2722* (2013.01); *B29C 2945/76006* (2013.01); *B29C 2945/7621* (2013.01); *B29C 2945/76287* (2013.01); *B29C 2945/76936* (2013.01); *B29L 2031/3044* (2013.01); *B29L 2031/712* (2013.01)

(58) Field of Classification Search
USPC .................................................. 425/572, 588
See application file for complete search history.

(56) References Cited

U.S. PATENT DOCUMENTS

| 2,350,348 | A | | 6/1944 | Gaugler |
| 3,127,753 | A | | 4/1964 | Tinnerman |
| 4,219,322 | A | | 8/1980 | Chang et al. |
| 4,252,294 | A | * | 2/1981 | Uchio ................. B29C 45/2708 249/105 |
| 4,620,958 | A | * | 11/1986 | Wiechard ................... 264/297.2 |

(Continued)

FOREIGN PATENT DOCUMENTS

| CN | 101091601 A | 12/2007 |
| CN | 102328395 A | 1/2012 |

(Continued)

OTHER PUBLICATIONS

Donald V. Rosato Ph.D., Dominick V. Rosato P.E., Injection Molding Handbook,1995,Chapman & Hall, pp. 257-265.*

(Continued)

*Primary Examiner* — Jill Heitbrink
(74) *Attorney, Agent, or Firm* — Marshall, Gerstein & Borun LLP

(57) ABSTRACT

A runner system for a multi-cavity injection molding system, the runner system having runners of reduced size.

6 Claims, 7 Drawing Sheets

(56) References Cited

U.S. PATENT DOCUMENTS

| | | |
|---|---|---|
| 5,037,592 A | 8/1991 | Erienbach |
| 5,350,288 A | 9/1994 | Kimoto et al. |
| 5,407,342 A | 4/1995 | Boucher et al. |
| 5,411,686 A | 5/1995 | Hata |
| 5,419,858 A | 5/1995 | Hata et al. |
| 5,478,520 A | 12/1995 | Kasai et al. |
| 5,518,389 A | 5/1996 | Nonomura et al. |
| 5,716,561 A | 2/1998 | Guergov |
| 5,728,329 A | 3/1998 | Guergov |
| 5,853,630 A | 12/1998 | Hettinga |
| 5,902,525 A | 5/1999 | Hettinga |
| 5,935,505 A | 8/1999 | Whetten et al. |
| 6,090,318 A | 7/2000 | Bader et al. |
| 6,276,656 B1 | 8/2001 | Baresich |
| 6,372,162 B1 | 4/2002 | Szchech |
| 6,464,909 B1 | 10/2002 | Kazmer et al. |
| 6,616,871 B1 | 9/2003 | Iimura et al. |
| 6,638,450 B2 * | 10/2003 | Richard .................... 264/1.32 |
| 6,719,942 B1 | 4/2004 | Triplett et al. |
| 6,749,934 B2 | 6/2004 | Nagayama et al. |
| 6,824,379 B2 | 11/2004 | Doyle et al. |
| 7,143,814 B1 | 12/2006 | James |
| 7,419,625 B2 | 9/2008 | Vasapoli et al. |
| 7,621,739 B2 | 11/2009 | Tilton et al. |
| 7,677,257 B2 | 3/2010 | Han |
| 7,785,090 B2 | 8/2010 | Amano et al. |
| 7,794,643 B2 | 9/2010 | Watanabe et al. |
| 7,910,029 B2 | 3/2011 | Koumaro |
| 7,914,273 B2 | 3/2011 | Naito et al. |
| 8,136,535 B2 | 3/2012 | Han |
| 8,235,694 B2 | 8/2012 | Nam |
| 8,235,697 B2 | 8/2012 | Olin et al. |
| 8,591,219 B1 | 11/2013 | Neufarth et al. |
| 8,807,145 B2 | 8/2014 | Han |
| 2001/0013672 A1 | 8/2001 | Kawamura et al. |
| 2002/0149135 A1 | 10/2002 | Choi et al. |
| 2006/0165837 A1 | 7/2006 | Wood |
| 2008/0064805 A1 | 3/2008 | Uosaki et al. |
| 2008/0143006 A1 | 6/2008 | Honma et al. |
| 2008/0197537 A1 | 8/2008 | Stemke |
| 2009/0020924 A1 | 1/2009 | Lin |
| 2009/0174101 A1 | 7/2009 | Johnson |
| 2011/0232856 A1 | 9/2011 | James |
| 2012/0035327 A1 | 2/2012 | Ciarafoni et al. |
| 2012/0291885 A1 | 11/2012 | Altonen et al. |
| 2012/0292823 A1 | 11/2012 | Altonen et al. |
| 2012/0294963 A1 | 11/2012 | Altonen et al. |
| 2012/0295049 A1 | 11/2012 | Altonen et al. |
| 2012/0295050 A1 | 11/2012 | Altonen et al. |
| 2012/0328724 A1 | 12/2012 | Altonen et al. |
| 2012/0329948 A1 | 12/2012 | Altonen et al. |
| 2013/0069280 A1 | 3/2013 | Altonen et al. |
| 2013/0113131 A1 | 5/2013 | Altonen et al. |
| 2013/0221572 A1 | 8/2013 | Berg, Jr. et al. |
| 2013/0221575 A1 | 8/2013 | Altonen et al. |
| 2013/0224327 A1 | 8/2013 | Altonen et al. |
| 2013/0295220 A1 | 11/2013 | Neufarth et al. |

FOREIGN PATENT DOCUMENTS

| | | |
|---|---|---|
| DE | 2427969 A1 | 1/1976 |
| DE | 102009046835 A1 | 5/2011 |
| GB | 2164895 A | 4/1986 |
| JP | 60127125 | 7/1985 |
| JP | 2098417 A | 4/1990 |
| JP | 3079317 A | 4/1991 |
| JP | 4126214 A | 4/1992 |
| JP | 5006914 A | 1/1993 |
| JP | 05077244 | 3/1993 |
| JP | 7223242 A | 8/1995 |
| JP | 11262936 | 9/1999 |
| JP | 2000280276 A | 10/2000 |
| JP | 2004066695 A | 3/2004 |
| JP | 2005215497 | 8/2005 |
| JP | 2010-274488 A | 12/2010 |
| WO | WO-01/62468 A1 | 8/2001 |
| WO | WO-2006/046437 A1 | 5/2006 |

OTHER PUBLICATIONS

Gunter Menning, Mold-Making Handbook, 1998, Hanser/Gardner Publications, pp. 91-94.*
Webster's Ninth New Collegiate Dictionary, 1990, p. 350.*
U.S. Appl. No. 61/861,298, filed Aug. 1, 2013, Altonen et al.
U.S. Appl. No. 61/861,304, filed Aug. 1, 2013, Altonen et al.
U.S. Appl. No. 61/861,310, filed Aug. 1, 2013, Altonen et al.
U.S. Appl. No. 13/672,246, filed Nov. 8, 2012, Altonen et al.
U.S. Appl. No. 14/085,515, filed Nov. 20, 2013, Altonen et al.
Alcoa:"QC-10 the aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.
"Specialized Aluminum Products for Tool and Mold Applications", May/Jun. 2003 issue of Aluminum Now journal of the Aluminum Association, Inc., 4 pages.
Ampco Metal, "Ampcoloy® 944: A new copper-silicon-chromium alloy for the Moldmaking Industry", brochure, 2 pages, www.ampcometal.com.
Ampco Metal, "Ampcoloy® 944", brochure, 2 pages, www.ampcometal.com.
Clinton Aluminum & Stainless Steel, "Why aluminum mold?" presentation, Oct. 30, 2006, 20 pages, toll free # 800-826-3370.
European Tool & Mould Making ETMM, "High strength, hardness, thermal conductivity characterize copper mould making alloy", online article Dec. 9, 2011, 2 pages, http://www.etmm-online.com/materials/articles/353445/.
Ampco Metal Inc., "Procurable Alloys", online article Nov. 2011, 5 pages, http://www.modernmetals.com/item/10715-procurable-alloys.html.
Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.
David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.
United States Patent and Trademark Office, online Trademark Electronic Search System, Moldmax HH, 2 pages, http://tess2.uspto.gov/bin/showfield?f=doc&state=4808:k8aqoi.3.8.
Rhoda Miel, "Aluminating Tooling", PlasticsNews.com online article Apr. 27, 2009, 2 pages, http://www.plasticsnews.com/article/20090427/News/304279985/aluminating-tooling.
Joseph Pryweller, "Aluminum Injection Mold", online article from PlasticsNews.com, Jan. 13, 2003, 2 pages, http://aluminuminjectionmold.com/articles.html.
David Bank et al., "Why Plastic Flows Better in Aluminum Injection Molds", plastics technology article Sep. 2008, 8 pages.
Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.
A L Kelly, et al, "The effect of copper alloy mold tooling on the performance of the injection molding process", online article from the Free Library, 10 pages, http://www.thefreelibrary.com/The+effect+of+copper—alloy—mold+tooling+on—the+performance.
United States Patent and Trademark Office, online Trademark Electronic Search System, QC 10, 2 pages, http://tess2.uspto.gov/bin/showfield?f=doc&state=4810:7di60m.2.1.
Thyssenkrupp Materials NA, "QC-10 Aluminum Mold Plate", brochure, 4 pages.
Uddeholm, "Moldmax HH", brochure, 8 pages, www.uddeholm.com.

(56) References Cited

OTHER PUBLICATIONS

Li et al., Automatic Layout Design of Plastic Injection Mould Cooling System, Computer-aided Design 37 (2005) 645-662.
International Search Report, U.S. Appl. No. 13/682,456, dated Aug. 2, 2013, 11 pages.
Barry James, "Evaporative Cooling Approach to Mold Temperature Control", article from MoldMaking Technology, posted on web Dec. 1, 2006, website http://www.moldmakingtechnology.com/articles/evaporative-cooling-approach-to-mold-temperature-control.
Richard Abbott et al., "Elimination Process Constraints in Plastics Injection Molding", ThermoCeramiX Inc.,Shirley, Massachesetts, , Department of Plastics Engineering, University of Massachusetts Lowell, 8 pages.
BASF article from www.plasticsportal.com/usa, 6 pages.
Schnerr-Haeselbarth O:"Der Heisse Draht Ins Werkzeug Werkseuginnendruck-Basierte Systeme Steigern Die Produktivitat Und Senken Die Kosten", Kunstoffe International, Carl Hanser Verlag, Munchen DE, vol. 92, No. 7, Jul. 1, 2002, pp. 56-60.
Wikipedia: "Low Pressure Molding", pp. 1-4, XP002681936, Internet: http://en.wikipedia.org/wiki/Low_pressure_molding.
Homes W et al: "Spritzgiessprozesse in Echtzeit Regeln Eine Neue Technik Zur Aktiven Angussbalancierung", Kunstoffe International, Carl Hanser Verlag, Munchen DE, vol. 91, No. 1, Jan. 1, 2001, pp. 68-70.
Suh et al., "Structure Development of Various Polyolefins in Injection Molding", Antec 2006, Society of Plastics Engineers, 2006, pp. 760-765.
International Search Report, U.S. Appl. No. 13/476,045, dated Aug. 17, 2012, 14 pages.
International Search Report, U.S. Appl. No. 13/476,045, dated Aug. 16, 2012, 12 pages.
International Search Report, U.S. Appl. No. 13/476,073, dated Sep. 3, 2012, 16 pages.
International Search Report, U.S. Appl. No. 13/476,197, dated Aug. 16, 2012, 11 pages.
International Search Report, U.S. Appl. No. 13/476,178, dated Aug. 17, 2012, 13 pages.
International Search Report, U.S. Appl. No. 13/476,584, dated Aug. 17, 2012, 13 pages.
Official Notice of Rejection (with English translation), Japanese patent application No. 2015-543153, dated Jul. 5, 2016.
First Office Action (with English translation), Chinese patent application No. 201380060855.7, dated Sep. 2, 2016.

* cited by examiner

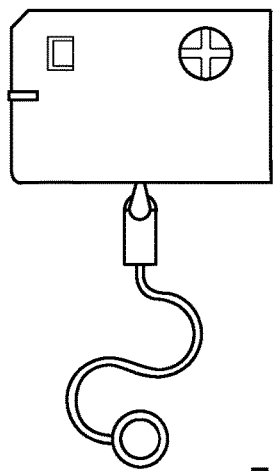
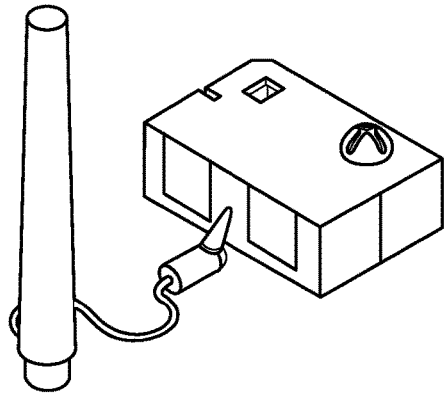
Fig. 7
Fig. 7A
Fig. 7B
Fig. 7C
Fig. 7D

REDUCED SIZE RUNNER FOR AN INJECTION MOLD SYSTEM

FIELD OF THE INVENTION

This disclosure relates generally to apparatuses and methods for injection molding and, more particularly, to apparatuses and methods for producing injection molded parts at substantially constant pressure.

BACKGROUND OF THE INVENTION

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now-molten polymer or resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel through one or more gates that direct the flow of the molten resin into the cavity. Thus, a typical injection molding procedure comprises four basic operations: (1) heating the plastic in the injection molding machine to allow it to flow under pressure; (2) injecting the melted plastic into a mold cavity or cavities defined between two mold halves that have been closed; (3) allowing the plastic to cool and harden in the cavity or cavities while under pressure; and (4) opening the mold halves to cause the part to be ejected from the mold.

The molten plastic resin is injected into the mold cavity and the plastic resin is forcibly pushed through the cavity by the injection molding machine until the plastic resin reaches the location in the cavity furthest from the gate. The resulting length and wall thickness of the part is a result of the shape of the mold cavity.

Multi-cavity injection molds require a network of feeder channels to distribute molten plastic from the machine nozzle to each individual mold cavity. The feeder channels or runners can be permitted to cool, or can be actively cooled, such that for each molding cycle the runners are filled with molten polymer that solidifies in the runners, and is then removed from the mold as a solid mass of plastic in the shape of the runner or feeder channel network. This type of system is referred to in the art as a "cold runner" system. It is also possible to heat the feeder channel or runner network, such that for each molding cycle the polymer remains molten. The molten polymer remains in the feeder channels or runners after each molding cycle—this molten material is then injected in to the mold cavity upon initiation of the subsequent molding cycle. This type of system is referred to as a "hot runner" system. A "runner system" as used herein, if not preceded by the adjective "hot" or "cold", refers to either a hot runner system or a cold runner system, as well as to a hybrid "hot-to-cold" runner system.

In the case of a cold runner system, the hydraulic diameter of the runner or feeder channel in closest proximity to a mold cavity typically ranges from about 1.5 to about 3 times the nominal wall thickness of the molded article. See, e.g., Beaumont, Runner and Gating Design Handbook, second edition, page 152, Hanser Gardner Publications, 2007. Hydraulic diameter, or $D_H$, is a term commonly used in the art to refer not only to the inner diameter of round tubes, but also to an effective inner diameter of non-circular tubes or channels, which may be calculated by the formula=4A/P, where A is the cross-sectional area of the tube or channel and P is the wetted inner perimeter of the cross-section of the tube or channel. This hydraulic diameter is intentionally greater than the article nominal wall thickness (a term defined hereinafter), so that the runner will remain molten longer than the molded part, ensuring that molten plastic can continue to be fed through the feeder network until the mold cavity is completely filled and packed. If polymeric material within the feeder channel were to freeze prior to the mold cavity being completely packed, the molded article would shrink away from the mold cavity excessively, and the molded article would have poor surface finish quality and undesirably high dimensional variation.

In another convention for sizing cold runners, the runners are designed to have a hydraulic diameter of 1.5 mm greater than the nominal wall thickness of an article to be molded. See, e.g., How to Make Injection Molds, Third Edition, page 153, Carl Hanser, 1993 (Germany).

In designing runner systems, conventional design parameters call for the runner to begin near the injection unit machine nozzle at a larger cross-sectional area, then progressively step down in cross-sectional area, as the runner is divided to achieve the desired number of runners to reach each individual mold cavity. Importantly, conventional wisdom indicates that the flow runner hydraulic diameter must be increased from a minimum design hydraulic diameter (as determined above) that feeds the mold cavity, to a progressively increasing hydraulic diameter at each branch in the runner along the flow path back to the machine nozzle. This is particularly the case for cold runner systems, as in hot runner systems, since there is not the same need to promote freeze-off and minimize scrap of polymeric material within the runners by minimizing runner diameter as there is in a cold runner system, the hydraulic diameters of runners at different branches of a hot runner system may be more uniform than the progressively-smaller diameters of a cold runner system with increasing proximity to the mold cavity.

In describing a runner system, it is useful to consider the following terms: The term "main sprue" refers to the first runner leg that is adjacent to the machine nozzle and receives molten polymer (also referred to herein as molten polymeric material or thermoplastic material) from the molding machine. For a multi-cavity mold, the main sprue is divided into multiple "runner branches", such that the number of "final runner branches" is equal to the total number of gate locations (usually one gate per mold cavity). The term "runner branch" refers to each of the flow channels in a runner network. The term "final runner branch" refers to the runner branches that connect directly to the gate, which then connects to the mold cavity. The term "node" refers to a location in the runner network where a runner is divided into smaller runner branches. For example, when the main sprue is divided into four runner branches extending out to four individual mold gates, the intersection of the main sprue with the runner branches is referred to herein as a "node".

For a conventional molding process, the size of each of the runner branches is related using the formula $D_m = D_b * N^{1/3}$, where N is the number of runner branches extending from a feeder branch $[D_m]$. N is equal to the number of times a feed runner $[D_m]$ is divided into equal runner branches $[D_b]$. $D_m$ and $D_b$ are hydraulic diameters.

For example, for a runner system where the main sprue is divided into four branches to feed four final runners, N would equal 4. Thus, where $D_b$ is equal to 6 millimeters, $D_m$ is equal to $6*4^{1/3}$ power, or $D_m$ is equal to about 9.524 millimeters.

In a second example, a runner system where the main sprue is divided into four equal branches, and each of the four equal branches is then divided into four equal final runner branches. The diameter of the main sprue would be determined by starting with the diameter of the final runner, then working back through the system to the main sprue. Thus, where the final runner diameter $[D_b]$ is equal to 6 millimeters, the feeder runner diameter $[D_m]$ is equal to $6*4^{1/3}$ power, or is equal to about 9.524 millimeters. The next feeder runner, which in this case would be the main sprue diameter, would then be calculated in the same manner starting with the diameter of about 9.524 millimeters. Thus, the diameter of the main sprue $[D_m]$ is equal to $9.524*4^{1/3}$, or 15.118 millimeters. An equivalent calculation is Dm=Db* [the total number of final runners]$^{1/3}$. For example, the 16 cavity tool indicated in second example above, if calculated by this formula provides the same answer of 15.118 millimeters. Specifically 6 mm*$16^{1/3}$ equals 15.118 millimeters. This relationship holds true regardless of the numbers of nodes located between the main sprue and the final runners. Each interim runner branch step would be related by the formula $D_m=D_b*N^{1/3}$.

This results in a substantial volume of plastic being required to distribute the polymer to the injection mold cavities. In the case of a cold runner system, this large volume can extend the cycle times for some parts, increase clamp tonnage (because the larger the volume of the runner system, the higher the volume of polymer material between the machine nozzle and the mold cavities, and the more clamp tonnage that may likely be necessary to mold articles along with the volume of runner material), and this substantial volume of polymer is typically disposed of for each "shot" of polymer injected in to the cavity—since the cold runner is typically discarded as scrap or reground for re-use in subsequent injection molding cycles. In the case of a hot runner system, this volume of material is heated during each molding cycle, thus the higher the volume of the runner, the longer the polymer residence time, and the longer the polymer is exposed to heat that degrades the polymer. Furthermore, the more volume of material contained in the hot runner, the more material that must be purged from the system when changing the color of a polymer or changing from one polymer material to another polymer material. This leads to lost productivity during the material changeover process. For both hot and cold runners, it is desirable to reduce the total volume of material contained in the runner.

SUMMARY OF THE INVENTION

Embodiments of the present invention generally relate to systems, including runner systems, machines, products, and methods of producing products by injection molding and more specifically to systems, including runner systems, products, and methods of producing products by substantially constant pressure injection molding.

The term "low peak pressure" as used herein with respect to peak melt pressure of a thermoplastic or molten polymeric material means peak melt pressures in a vicinity of a nozzle of an injection molding machine of 6000 psi and lower. The peak melt pressure may be measured at locations in the runner system other than in a vicinity of the nozzle, such as in the main sprue, any of the runner branches, or in the vicinity of the gate at the entrance of the mold cavity.

The term "intermediate peak pressure" as used herein with respect to peak melt pressure of a thermoplastic or molten polymeric material means peak melt pressures in a vicinity of a nozzle of an injection molding machine of approximately 6,000 psi to approximately 15,000 psi.

The term "high peak pressure" as used herein with respect to peak melt pressure of a thermoplastic or molten polymeric material means peak melt pressures in a vicinity of a nozzle of an injection molding machine of greater than 15,000 psi.

The term "substantially low constant pressure" as used herein with respect to a melt pressure of a thermoplastic material means that deviations from a baseline melt pressure do not produce meaningful changes in physical properties of the thermoplastic material. For example, "substantially low constant pressure" includes, but is not limited to, pressure variations for which viscosity of the melted thermoplastic material does not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure. The peak melt pressure could be as high as 6000 psi for a low peak pressure system.

The term "substantially intermediate constant pressure" as used herein with respect to a melt pressure of a thermoplastic material means that deviations from a baseline melt pressure do not produce meaningful changes in physical properties of the thermoplastic material. For example, "substantially intermediate constant pressure" includes, but is not limited to, pressure variations for which viscosity of the melted thermoplastic material does not meaningfully change. The term "substantially constant" in this respect includes deviations of approximately 30% from a baseline melt pressure. For example, the term "a substantially constant pressure of approximately 11,000 psi" includes pressure fluctuations within the range of about 14,300 psi (30% above 11,000 psi) to about 7,700 psi (30% below 11,000 psi). A melt pressure is considered substantially constant as long as the melt pressure fluctuates no more than 30% from the recited pressure. The peak melt pressure could be as high as 14,300 psi. It is found that when molten polymer is introduced to a mold at substantially constant pressure with peak melt pressures at approximately 6,000 psi or below, or between 6,000 psi and 15,000 psi, or between 15,000 and 20,000 psi, as opposed to the conventional mold systems not maintained at substantially constant pressure because such conventional systems are controlled by volumetric flow rate, the size (i.e., volume) of the runners from the nozzle to the mold cavities, and in particular, the size of the runners in closest proximity to the mold cavities, may be significantly smaller than runners in conventional high, variable pressure (sometimes referred to as spike pressure) injection molding systems. For a given length runner, the runner size may vary due to changes in the runner hydraulic cross-sectional area or the runner hydraulic diameter.

Decreasing the size of the runners has several benefits. In the case of cold runners, decreasing the runner size advantageously increases options regarding the mold cavity spacing because the cavities may be spaced more closely to one another. Potentially, so much space between cavities can be saved in an overall mold such that the number of total cavities that can be provided in a given mold can be increased. Another advantage to a decreasing runner size in a cold runner system is that it reduces the energy needed to introduce molten polymer through the runner system and ultimately to the mold cavities.

An additional benefit of smaller feed channels or runners in a cold runner system as compared to conventional injection molding systems is that because the cold runner is ejected or otherwise removed at the end of a molding cycle, and reground for use in subsequent molding cycles, reducing the size of the runners reduces the size of those cold runners that need to be ejected or removed at the end of a molding cycle. By reducing the size of the runners, and thereby reducing the amount of material that needs to be reground, the integrity and quality of the resulting molded articles is increased, because the percentage of regrind in any given injection molding cycle is reduced.

For a hot runner system, a benefit of a reduced-sized runner is that there is less of a pressure drop from branch to branch of the runners (i.e., from runners closest to the nozzle to the runners closest to the mold cavities), permitting the injection molding system to maintain constant pressure and make more consistent parts. A reduced hot runner size translates to reduced molten polymer in the runner system, thereby reducing the polymer residence time, and shortening the duration of exposure to heat (minimizing polymer degradation). With less polymer material contained in the hot runner, less material would need to be purged from the system when changing the color of a polymer or changing from one polymer material to another polymer material, thereby reducing changeover time. As with a cold runner system, reduced runner size could provide benefits in spacing, and even overall number, of cavities in a given mold.

The manner in which these and other benefits of an injection molding system having a reduced runner size is achieved is explained in the following detailed description of the invention.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 illustrates a top view of an experimental mold and part used to generate the data from which the comparison charts of FIGS. 3-6 were formed.

FIG. 7A illustrates an isometric view of the experimental mold and part of FIG. 7.

FIG. 7B illustrates a front view of the experimental mold and part of FIG. 7.

FIG. 7C illustrates a cross-sectional view of the experimental mold and part of FIG. 7.

FIG. 7D illustrates a side view of the experimental mold and part of FIG. 7.

DETAILED DESCRIPTION OF THE INVENTION

Figure 1:
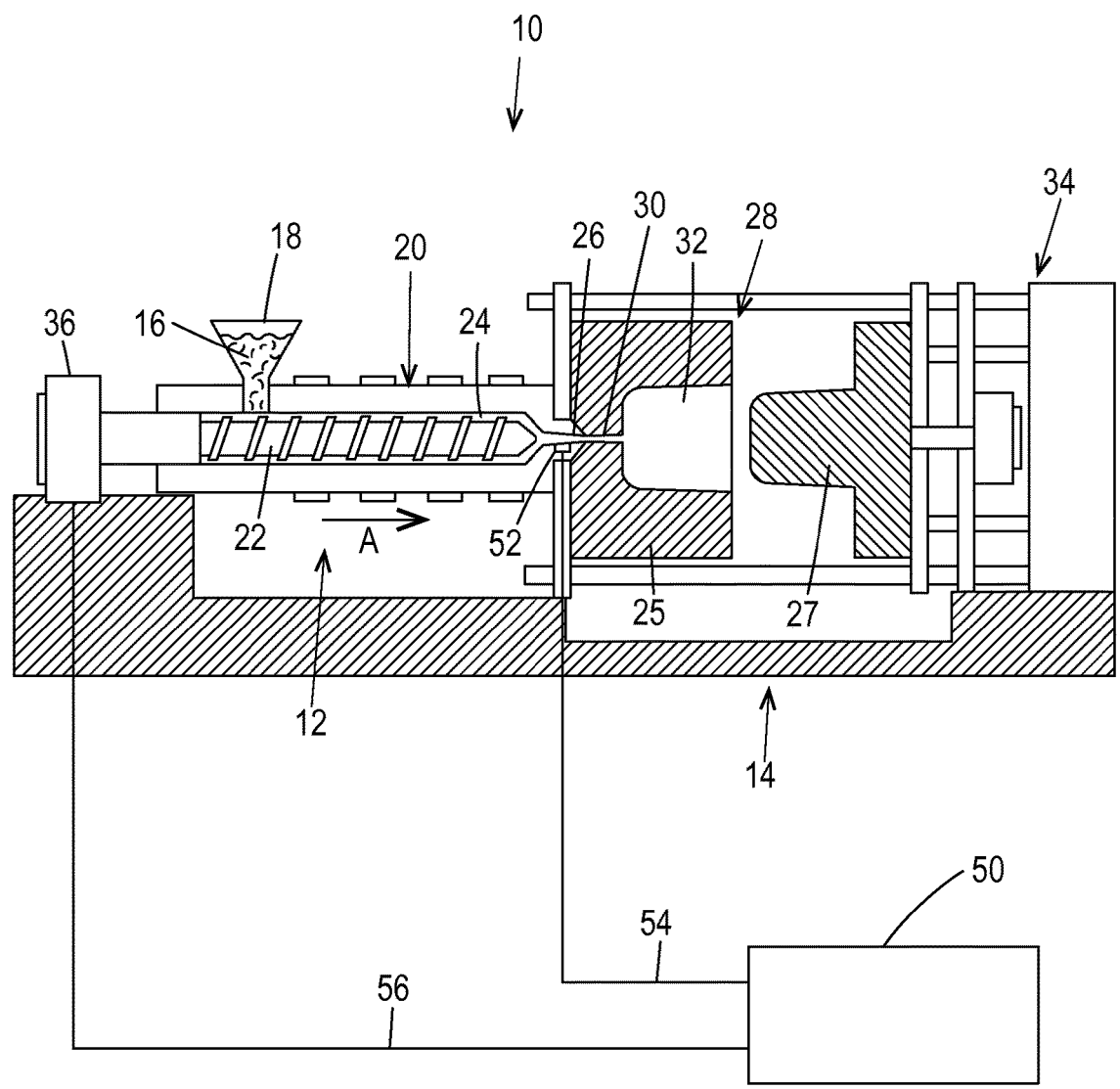
FIG. 1 illustrates a schematic view of a high productivity injection molding machine constructed according to the present disclosure.

Referring to the figures in detail, FIG. 1 illustrates an exemplary substantially constant pressure (with peak pressures ranging from about 1,000 to <6000 psi, from about 6,000-about 10,000 psi, about 10,000 to about 15,000 psi, and about 15,000 to about 20,000 psi) injection molding apparatus 10 for producing thin-walled parts in high volumes (e.g., a class 101 or 102 injection mold, or an "ultra high productivity mold"). The injection molding apparatus 10 generally includes an injection system 12 and a clamping system 14. A thermoplastic material may be introduced to the injection system 12 in the form of thermoplastic pellets 16. The thermoplastic pellets 16 may be placed into a hopper 18, which feeds the thermoplastic pellets 16 into a heated barrel 20 of the injection system 12. The thermoplastic pellets 16, after being fed into the heated barrel 20, may be driven to the end of the heated barrel 20 by a reciprocating screw 22. The heating of the heated barrel 20 and the compression of the thermoplastic pellets 16 by the reciprocating screw 22 causes the thermoplastic pellets 16 to melt, forming a molten thermoplastic material 24. The molten thermoplastic material is typically processed at a temperature of about 130° C. to about 410° C.

The reciprocating screw 22 forces the molten thermoplastic material 24, toward a nozzle 26 to form a shot of thermoplastic material, which will be injected into a mold cavity 32 of a mold 28. The molten thermoplastic material 24 may be injected through a gate 30, which directs the flow of the molten thermoplastic material 24 to the mold cavity 32. The mold cavity 32 is formed between first and second mold parts 25, 27 of the mold 28 and the first and second mold parts 25, 27 are held together under pressure by a press or clamping unit 34. For instance, the press or clamping unit 34 applies a clamping force in the range of approximately 1000 psi to approximately 6000 psi during the molding process to hold the first and second mold parts 25, 27 together while the molten thermoplastic material 24 is injected into the mold cavity 32. To support these clamping forces, the clamping system 14 may include a mold frame and a mold base, the mold frame and the mold base being formed from a material having a surface hardness of more than about 165 BHN and preferably less than 260 BHN, although materials having surface hardness BHN values of greater than 260 may be used as long as the material is easily machinable, as discussed further below.

Once the shot of molten thermoplastic material 24 is injected into the mold cavity 32, the reciprocating screw 22 stops traveling forward. The molten thermoplastic material 24 takes the form of the mold cavity 32 and the molten thermoplastic material 24 cools inside the mold 28 until the thermoplastic material 24 solidifies. Once the thermoplastic material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates.

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 that is fluidly connected with the nozzle 26. If the sensor 52 is not located within the nozzle 26, appropriate correction factors may be applied to the measured characteristic to calculate the melt pressure in the nozzle 26. In yet other embodiments, the sensor 52 need not be fluidly connected with the nozzle. Rather, the sensor could measure clamping force generated by the clamping system 14 at a mold parting line between the first and second mold parts 25, 27.

Although an active, closed loop controller 50 is illustrated in FIG. 1, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent overpressurization of the mold 28. Another alternative mechanism for preventing overpressurization of the mold 28 is to activate an alarm when an overpressurization condition is detected.

Molded parts are generally considered to be thin-walled when a length of a flow channel L divided by a thickness of the flow channel T is greater than 100 (i.e., L/T>100), but less than 1000. For mold cavities having a more complicated geometry, the L/T ratio may be calculated by integrating the T dimension over the length of the mold cavity 32 from a gate 30 to the end of the mold cavity 32, and determining the longest length of flow from the gate 30 to the end of the mold cavity 32. The L/T ratio can then be determined by dividing the longest length of flow by the average part thickness. In the case where a mold cavity 32 has more than one gate 30, the L/T ratio is determined by integrating L and T for the portion of the mold cavity 32 filled by each individual gate and the overall L/T ratio for a given mold cavity is the highest L/T ratio that is calculated for any of the gates. In some injection molding industries, thin-walled parts may be defined as parts having an L/T>100, or having an L/T>200, but <1000. The length of the flow channel L is the longest flow length as measured from the gate 30 to the end 104 of the mold cavity. Thin-walled parts are especially prevalent in the consumer products industry.

High L/T ratio parts are commonly found in molded parts having average thicknesses less than about 10 mm. In consumer products, products having high L/T ratios generally have an average thickness of less than about 5 mm. For example, while automotive bumper panels having a high L/T ratio generally have an average thickness of 10 mm or less, tall drinking glasses having a high L/T ratio generally have an average thickness of about 5 mm or less, containers (such as tubs or vials) having a high L/T ratio generally have an average thickness of about 3 mm or less, bottle cap enclosures having a high L/T ratio generally have an average thickness of about 2 mm or less, and individual toothbrush bristles having a high L/T ratio generally have an average thickness of about 1 mm or less. The high productivity injection molding processes and devices disclosed herein are particularly advantageous for parts having a thickness of 5 mm or less and the disclosed processes and devices are more advantageous for thinner parts.

Thin-walled parts with high L/T ratios present certain obstacles in injection molding. For example, the thinness of the flow channel tends to cool the molten thermoplastic material before the material reaches the flow channel end 104. When this happens, the thermoplastic material freezes off and no longer flows, which results in an incomplete part. To overcome this problem, traditional injection molding machines inject the molten thermoplastic material at high variable pressures, typically greater than a peak pressure of 15,000 psi, so that the molten thermoplastic material rapidly fills the mold cavity before having a chance to cool and freeze off. This is one reason that manufacturers of the thermoplastic materials teach injecting at high variable pressures. Another reason traditional injection molding machines inject at high pressures is the increased shear, which increases flow characteristics, as discussed above. These high variable injection pressures require the use of very hard materials to form the mold 28 and the feed system, among other things. Moreover, the thin walled parts may include one or more special features, such as a living hinge, a filament, a closure, a dispenser, a spout, a bellows, and an actuator, that must be filled before the material freezes.

When filling at substantially constant pressure, it was generally thought that the filling rates would need to be reduced relative to conventional filling methods. This means the polymer would be in contact with the cool molding surfaces for longer periods before the mold would completely fill. Thus, more heat would need to be removed before filling, and this would be expected to result in the material freezing off before the mold is filled. It has been unexpectedly discovered that the thermoplastic material will flow when subjected to substantially constant pressure conditions despite a portion of the mold cavity being below the no-flow temperature of the thermoplastic material. It would be generally expected by one of ordinary skill in the art that such conditions would cause the thermoplastic material to freeze and plug the mold cavity rather than continue to flow and fill the entire mold cavity. Without intending to be bound by theory, it is believed that the substantially constant pressure conditions of embodiments of the disclosed method and device allow for dynamic flow conditions (i.e., constantly moving melt front) throughout the entire mold cavity during filling. There is no hesitation in the flow of the molten thermoplastic material as it flows to fill the mold cavity and, thus, no opportunity for freeze-off of the flow despite at least a portion of the mold cavity being below the no-flow temperature of the thermoplastic material.

Additionally, it is believed that as a result of the dynamic flow conditions, the molten thermoplastic material is able to maintain a temperature higher than the no-flow temperature, despite being subjected to such temperatures in the mold cavity, as a result of shear heating. It is further believed that the dynamic flow conditions interfere with the formation of crystal structures in the thermoplastic material as it begins the freezing process. Crystal structure formation increases the viscosity of the thermoplastic material, which can prevent suitable flow to fill the cavity. The reduction in crystal structure formation and/or crystal structure size can allow for a decrease in the thermoplastic material viscosity as it flows into the cavity and is subjected to the low temperature of the mold that is below the no-flow temperature of the material.

Figure 2:
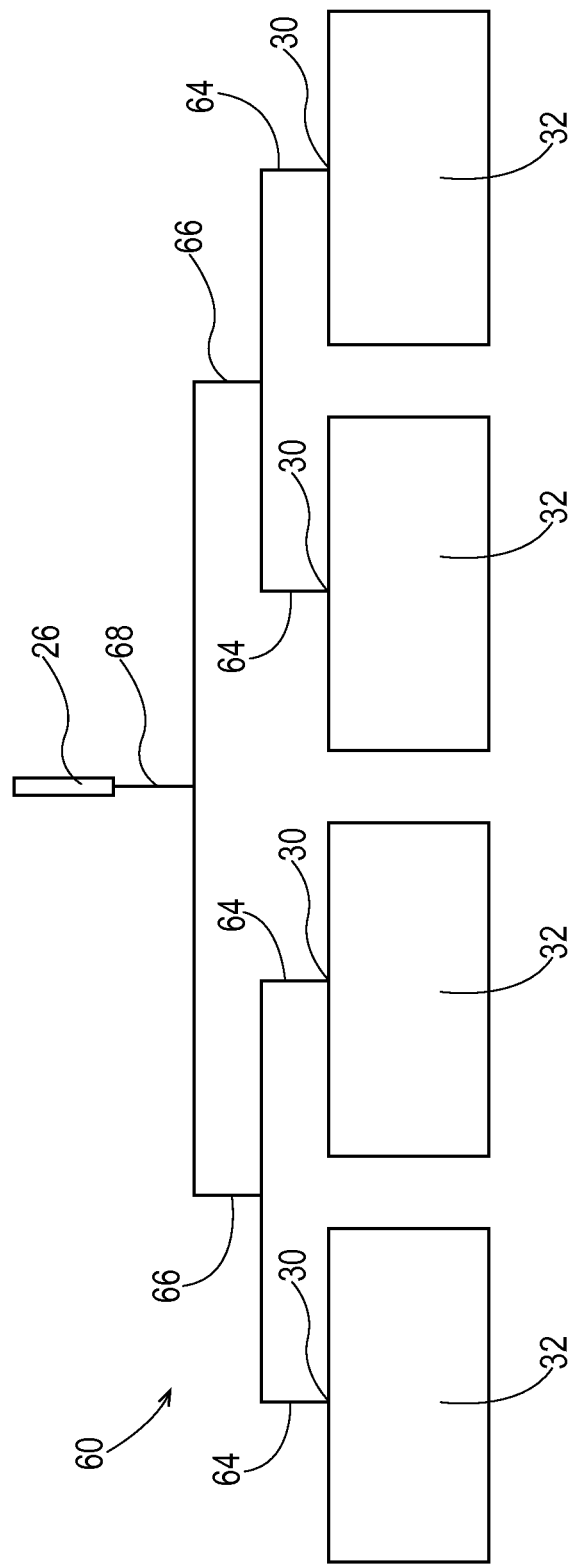
FIG. 2 illustrates a schematic view of a multi-cavity injection molding system with multiple branches of runners provided between a nozzle and the mold cavities.

Referring to FIG. 2, which schematically illustrates portions of a multi-cavity injection molding system, a plurality of mold cavities 32 are provided, in each of which a distinct article or part is to be injection molded. A system of feeder channels or runners 60 is provided between a nozzle 26 and gates 30. The runners 64 of a first branch set, also referred to herein as the final runners, are the runners disposed in closest proximity to the mold cavities 32. Each of the runners 66 of a second branch set of runners are in fluid communication with at least two of the runners 64 of the first branch set of runners. The runners 66 of the second branch set of runners are disposed one step, or branch level, more remote from the gates 30 of the mold cavities 32 (and thus one step, or branch level, closer to the nozzle 26) than the runners 64 of the first branch set of runners.

A main runner 68 is in fluid communication with each runner 66 of the second branch of runners, with the main runner 68 being the runner in closest proximity to the nozzle 26, and thus most remote from the gates 30 of the mold cavities 32. The main runner 68 may be the main sprue of the system. As used herein, runners and other structural elements in fluid communication with one another need not be in direct fluid communication, but merely must have the capability of molten polymeric material moving from one to the other, whether directly or indirectly.

While FIG. 2 illustrates a four-cavity mold with three runner branches, it is recognized that additional mold cavities 32 and branch sets of runners may be provided intermediate a first runner branch set of runners 64 in closest proximity to a plurality of mold cavities and a main runner 68 in closest proximity to a nozzle 26. In addition, while FIG. 2, for convenience, is illustrated in two dimensions, it is recognized that runner systems may be designed and manufactured to split off at each branch in a number of directions. For instance, while the main runner 68 in closest proximity to the nozzle 26 is illustrated as a single runner, the nozzle 26 may alternatively split immediately into a set of main runners that split into, for example, four directions. While even numbered cavity distributions are often used for ease manufacturing and mold layout, alternate configurations including odd number of splits, leading to any number of total cavities, whether even or odd. If one were to desire a non-even numbered cavity distribution, a substantially constant pressure injection molding process would facilitate that.

In the design of conventional multi-cavity injection molding systems, various rules of thumb or industry-accepted benchmarks have been developed for determining appropriate runner size for a given part to be molded. As discussed in the Background of the Invention section, some of these include:

The hydraulic diameter of the runner or feeder channel in closest proximity to a mold cavity should range from about 1.5 to about 3 times the nominal wall thickness of the molded article. See, e.g., Beaumont, Runner and Gating Design Handbook, second edition, page 152, Hanser Gardner Publications, 2007.

The hydraulic diameter of the runner or feeder channel in closest proximity to a mold cavity should be at least 1.5 mm greater than the nominal wall thickness of a part to be molded. See, e.g., How to Make Injection Molds, third edition, page 153, Carl Hanser, 1993 (Germany).

The hydraulic diameter of the main runner 68 [$d_{main}$] (which is the runner closest to the machine nozzle) and the hydraulic diameter of each runner 66, 64 of the subsequent (i.e., lower-numbered) runner branches [$d_{branch}$], is related by the formula $d_{main}=d_{branch} \times N^{1/3}$, where N is the number of runner branches needed between the machine nozzle 26 and a single mold cavity 32.

As used herein, the term "nominal wall thickness" is defined as the theoretical thickness of a mold cavity if the mold cavity were made to have a uniform thickness. The nominal wall thickness may be approximated by the average wall thickness. The nominal wall thickness may be calculated by integrating length and width of the mold cavity that is filled by an individual gate. It is recognized that articles or parts molded in a mold cavity can vary in thickness across the length of the part. In some instances, the thickness of a part in its gate region(s) (i.e., in the portion(s) of the part positioned in the mold cavity at the location(s) where molten polymeric material was introduced from a feeder channel or runner system through gate(s) 30 and into the mold cavity 32) is significantly thinner than the thickness of the overall part. As it is found that the hydraulic diameter of a runner can be minimized when designed based on relationships to the wall thickness of the part at the gates, as opposed to a nominal wall thickness of an overall part, this disclosure refers to a "gate thickness" of the article or part to be molded in a given mold cavity 32. However, it is recognized that for parts having a substantially constant thickness throughout, including in the gate location, the formulas and relationships described herein could likewise refer to the nominal wall thickness of the mold cavity.

It is found that by operating a multi-cavity injection molding system at a substantially constant pressure, at peak pressures below 20,000 psi, runner size may be reduced relative to injection molding systems operating at variable pressure. Such an injection molding system may utilize coated or uncoated molds manufactured of a high thermal conductivity material, such as aluminum, aluminum alloy, or beryllium copper. Alternatively, lower thermal conductivity coated or uncoated molds, such as steel or steel alloys, in multi-cavity injection molding can be operated at substantially constant pressure. Adjacent and surrounding mold plates may also be made of materials including aluminum, aluminum alloy, beryllium copper, steel, or steel alloy. All of these substantially constant pressure injection molding systems enable effective use of reduced-size runners as compared to conventional injection molding systems operating at variable pressure. Because the substantially constant pressure injection molding process requires significantly less force and energy to introduce molten polymeric material into a runner system, the hydraulic diameters of individual feed channels or runners throughout that runner system, including at least those in closest proximity to the mold cavities 32, but in many cases, even the main runner 68 closest to the nozzle 26, can be significantly smaller than the hydraulic diameters of runners that would be designed for a conventional injection molding system in accordance with the aforementioned industry-accepted runner design calculations.

For example, it is found that the hydraulic diameter of the main runner 68 [$d_{main}$] and the hydraulic diameter of each runner 36, 34 of the subsequent runner branches [$d_{branch}$], in a substantially constant injection molding system of the present disclosure, may be related by the formula $d_{main}=d_{branch} \times N^{1/3.1}$ where N is the number of runner branches needed between the machine nozzle 26 and a single mold cavity 32. Alternately, they may be related by the formula $d_{main}=d_{branch} \times N^{1/8}$.

Furthermore, the hydraulic diameter of the runners 64 of the first branch set of runners may be less than the gate thickness (i.e., less than the nominal wall thickness of a mold cavity for a part having substantially the same thickness throughout, including at the gate(s)), which is contrary to the conventional teachings of designing runners such that the hydraulic diameters thereof are about 1.5 to about 3 times the nominal wall thickness, or 1.5 mm larger than the nominal wall thickness, of a part molded in the mold cavity. Not only can the hydraulic diameter of the runners 64 of the first branch set of runners may be less than the gate thickness, but they can be less than 93% of the gate thickness.

Example 1

A test was performed to determine how runner sizes could be designed for use with a substantially constant pressure injection molding process as compared to a conventional variable pressure injection molding process. The test was performed using 20MFI Braskem Polypropelene Homopolymer FT200WV (with no colorant). The test was performed using an Engel 100TL 100-ton hydraulic tiebarless injection molding press. The test was performed with a mold temperature at a constant 65° F. The Melt Temperature was 420° F. For the conventional variable pressure process, a mold viscosity test was performed to establish the injection rate. A set point of 4.5 in/second was used for each run, or volumetrically, 2.65 in³/sec (43.43 cm³/sec).

For the substantially constant pressure process, or "SCPP", the pressure and time were controlled to achieve the given part weight of 2.51 grams without freezing the gate or runner that would lead to short shots.

A steel prototyping/experimental mold as depicted in FIG. 7 was used, with cold runner inserts of the following hydraulic diameters and respective runner L/T ratios: 0.030" (100), 0.040"(75), 0.045"(67), 0.062"(48), 0.078"(38), 0.093"(32), and 0.125"(24). The runner length was a constant 3" and the runner had a full round profile. For this test, the part L/T was 35 with nominal wall thickness 0.043 inch.

The focus of the test was to determine processing parameters and pressures required to produce a qualitatively acceptable injection molded part. A part was determined to be qualitatively acceptable by measuring its final part weight and inspecting it for the absence of flash or sink. If the injection molding process conditions failed to fully pack the part (i.e., there was a short shot), the part was deemed unacceptable. Data measurements were taken in the form of peak melt pressure measured at the injection nozzle, and peak post gate pressure, which were recorded, and the corresponding pressure loss across the part.

During the test, parts were held to within 0.5% of the processes being compared (i.e., substantially constant pressure processes versus variable pressure or conventional processes). On average, conventional pressures were approximately 29% higher than that of the substantially constant pressures, with the percent difference increasing slightly as runner diameter increased.

Peak pressures were recorded using a Dynisco Melt Transducer located in the nozzle. Post gate pressures were recorded using a Kistler 2.5 mm Kistler Pressure/Temperature sensor running through a 5073 programmable charge amp, also from Kistler.

TABLE 1

Experimental Results of:
Conventional Process Control[&&] and Substantially Constant Pressure Process Control[##]
versus
Cold Runner Diameter[%%]

| Col A Actual Runner Diameter[a] (inches) | Col B Calc Runner Cross-Sectional Area[b] (inches²) | Peak Melt Pressure (psi) | | Peak Melt Pressure/Part L/T (psi per dimensionless part L/T ratio) | | Molded Part Quality | |
|---|---|---|---|---|---|---|---|
| | | Conventional Process Control (~Constant Volumetric Rate) | Substantially Constant Pressure Control | Conventional Process Control (~Constant Volumetric Rate) | Substantially Constant Pressure Control | Conventional Process Control (~Constant Volumetric Rate) | Substantially Constant Pressure Control |
| 0.03 | 0.000707 | 25067 | 20151 | 696.3 | 559.8 | Fail | Pass |
| 0.04 | 0.001257 | 19272 | 14411 | 535.3 | 400.3 | Marginal | Pass |
| 0.045 | 0.001590 | 17576 | 13243 | 488.2 | 367.9 | Pass | Pass |
| 0.062 | 0.003019 | 12401 | 8270 | 344.5 | 229.7 | Pass | Pass |
| 0.078 | 0.004778 | 9904 | 6644 | 275.1 | 184.6 | Pass | Pass |

TABLE 1-continued

Experimental Results of:
Conventional Process Control[&&] and Substantially Constant Pressure Process Control[##]
versus
Cold Runner Diameter[%%]

| Col A<br>Actual<br>Runner<br>Diameter[a]<br>(inches) | Col B<br>Calc<br>Runner<br>Cross-<br>Sectional<br>Area[b]<br>(inches²) | Peak Melt Pressure (psi) | | Peak Melt Pressure/Part L/T (psi per dimensionless part L/T ratio) | | Molded Part Quality | |
|---|---|---|---|---|---|---|---|
| | | Conventional Process Control (~Constant Volumetric Rate) | Substantially Constant Pressure Control | Conventional Process Control (~Constant Volumetric Rate) | Substantially Constant Pressure Control | Conventional Process Control (~Constant Volumetric Rate) | Substantially Constant Pressure Control |
| 0.093 | 0.006793 | 9114 | 5385 | 253.2 | 149.6 | Pass | Pass |
| 0.125 | 0.012271 | 7486 | 4332 | 207.9 | 120.3 | Pass | Pass |

Notes
[&&]An (approximate) constant volumetric setting was employed for the Conventional Process Control
[##]A transducer sensor in the melt in the vicinity of the nozzle provided data to a substantially constant pressure process controller for controlling to a substantially constant pressure.
[%%]Diameter of the sprue was held constant and is 0.23 inch.
[a]In this experiment runner cross-section was circular in shape therefore actual runner diameter = hydraulic runner diameter.
[b]In this experiment runner cross-section was circular in shape therefore actual runner cross-sectional area = hydraulic runner cross-sectional area. This column is calculated from Col A via formula for area of a circle.
Molded Part Quality Key:
Pass = parts at that condition met the full part weight target of 2.51 grams and there was no flashing or sink in the parts.
Fail = parts at that condition resulted in short shots and did not meet the full part weight target of 2.51 grams.
Marginal = parts at that condition met full the part weight target of 2.51 grams, but there was flashing and sink in the parts.

For each runner diameter, ten parts were each made for the Conventional Process Control and Substantially Constant Pressure Control conditions. The reported data is the average of the ten parts produced at each test condition.

Single cavity mold with cold runner system. Runner length constant at 3 inches.

A runner system for a multi-cavity mold for a substantially constant pressure injection molding system may therefore be designed with each runner 64 of the branch runner set closest to the mold cavities 32 having a hydraulic diameter of less than 1.5 times the gate thickness, and preferably in a range of 0.5-1.5 times the gate thickness, and for systems operating at relatively lower pressures, more preferably in a range of 0.5 to 0.9 times a gate thickness.

Based on the above-described comparative test for conventional injection molding systems as well as for injection molding systems intended for operation at substantially constant pressure, various relationships between hydraulic runner diameter for the runner 64 of the branch runner set closest to the mold cavities 32 and peak melt pressure, as well as between cross-sectional area of the runner 64 of the branch runner set closest to the mold cavities 32 and peak melt pressure, are definable.

Figure 3:
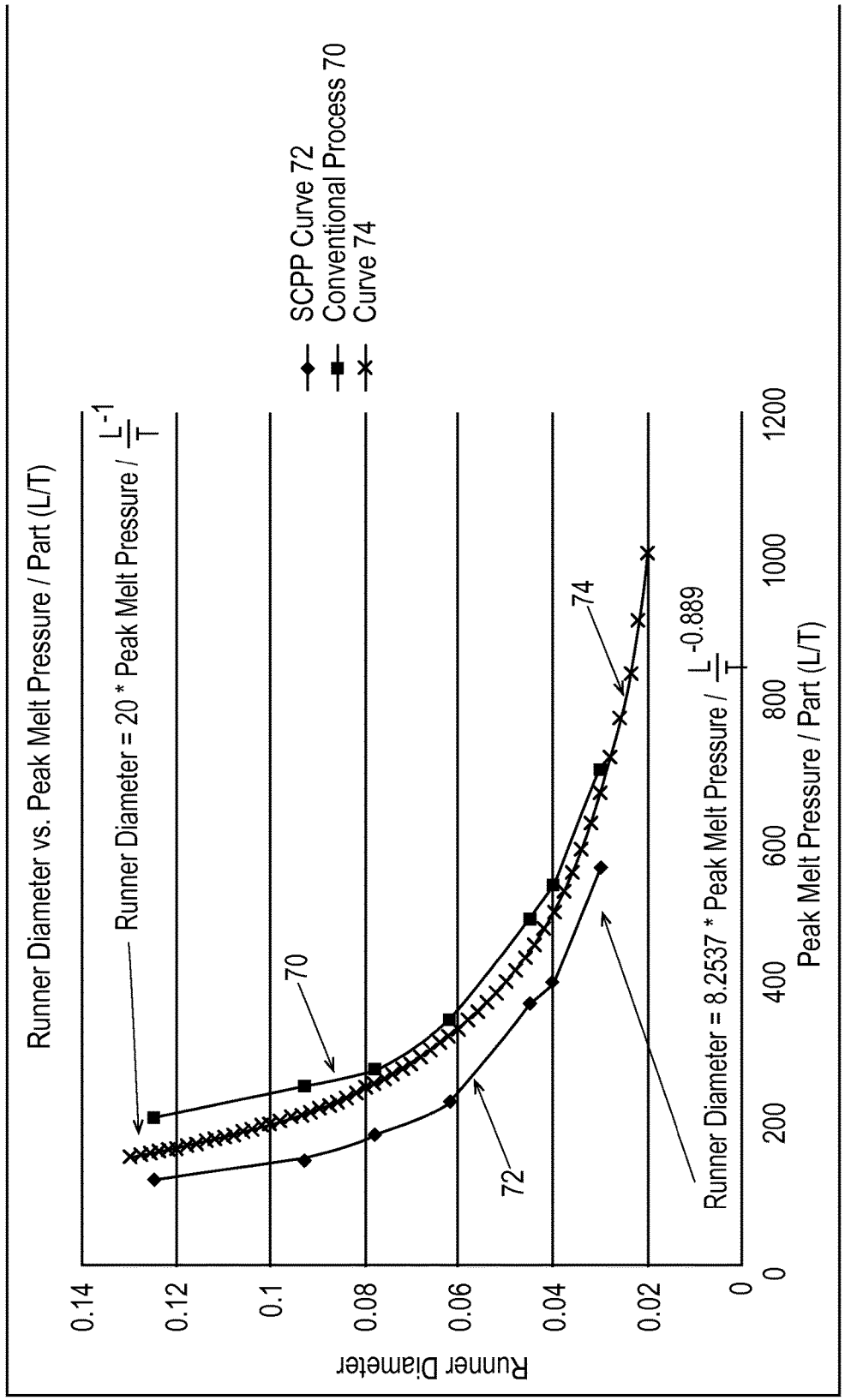
FIG. 3 illustrates a comparison of the relationship of hydraulic runner diameter to the quotient of peak melt pressure over L/T for a part molded at a substantially constant pressure.

Turning to FIG. 3, a comparison of the relationship of hydraulic runner diameter to the quotient of peak melt pressure over L/T for a part is illustrated. The data from which the comparison plot was generated is provided in the following table:

Curve 74

| Runner Dia | Runner Diameter = 20*Peak Melt Pressure/L/T⁻¹ | Peak Melt Pressure/Part (L/T) SCPP (Curve 72) | Conventional | Actual Runner Dia |
|---|---|---|---|---|
| 0.02 | 1000 | 559.8 | 696.3 | 0.03 |
| 0.022 | 909.0909091 | 400.3 | 535.3 | 0.04 |
| 0.024 | 833.3333333 | 367.9 | 488.2 | 0.045 |

-continued

Curve 74

| Runner Dia | Runner Diameter = 20*Peak Melt Pressure/L/T⁻¹ | Peak Melt Pressure/Part (L/T) SCPP (Curve 72) | Conventional | Actual Runner Dia |
|---|---|---|---|---|
| 0.026 | 769.2307692 | 229.7 | 344.5 | 0.062 |
| 0.028 | 714.2857143 | 184.6 | 275.1 | 0.078 |
| 0.03 | 666.6666667 | 149.6 | 253.2 | 0.093 |
| 0.032 | 625 | 120.3 | 207.9 | 0.125 |
| 0.034 | 588.2352941 | | | |
| 0.036 | 555.5555556 | | | |
| 0.038 | 526.3157895 | | | |
| 0.04 | 500 | | | |
| 0.042 | 476.1904762 | | | |
| 0.044 | 454.5454545 | | | |
| 0.046 | 434.7826087 | | | |
| 0.048 | 416.6666667 | | | |
| 0.05 | 400 | | | |
| 0.052 | 384.6153846 | | | |
| 0.054 | 370.3703704 | | | |
| 0.056 | 357.1428571 | | | |
| 0.058 | 344.8275862 | | | |
| 0.06 | 333.3333333 | | | |
| 0.062 | 322.5806452 | | | |
| 0.064 | 312.5 | | | |
| 0.066 | 303.030303 | | | |
| 0.068 | 294.1176471 | | | |
| 0.07 | 285.7142857 | | | |
| 0.072 | 277.7777778 | | | |
| 0.074 | 270.2702703 | | | |
| 0.076 | 263.1578947 | | | |
| 0.078 | 256.4102564 | | | |
| 0.08 | 250 | | | |
| 0.082 | 243.902439 | | | |
| 0.084 | 238.0952381 | | | |
| 0.086 | 232.5581395 | | | |
| 0.088 | 227.2727273 | | | |
| 0.09 | 222.2222222 | | | |
| 0.092 | 217.3913043 | | | |
| 0.094 | 212.7659574 | | | |
| 0.096 | 208.3333333 | | | |

-continued

Curve 74

| Runner Dia | Runner Diameter = 20*Peak Melt Pressure/L/T⁻¹ | Peak Melt Pressure/Part (L/T) SCPP (Curve 72) | Conventional | Actual Runner Dia |
|---|---|---|---|---|
| 0.098 | 204.0816327 | | | |
| 0.1 | 200 | | | |
| 0.102 | 196.0784314 | | | |
| 0.104 | 192.3076923 | | | |
| 0.106 | 188.6792453 | | | |
| 0.108 | 185.1851852 | | | |
| 0.11 | 181.8181818 | | | |
| 0.112 | 178.5714286 | | | |
| 0.114 | 175.4385965 | | | |
| 0.116 | 172.4137931 | | | |
| 0.118 | 169.4915254 | | | |
| 0.12 | 166.6666667 | | | |
| 0.122 | 163.9344262 | | | |
| 0.124 | 161.2903226 | | | |
| 0.126 | 158.7301587 | | | |
| 0.128 | 156.25 | | | |
| 0.13 | 153.8461538 | | | |

The curve 70, depicted as the "Conventional" curve farthest to the upper right, represents the relationship of hydraulic runner diameter to [peak melt pressure/(part L/T)] for a conventional injection molding system or process. The curve 72, depicted as the "SCPP" curve farthest to the lower left, represents the relationship of hydraulic runner diameter to [peak melt pressure/(part L/T)] for a substantially constant injection molding system or process of the present disclosure. The curve 74 intermediate curves 70 and 72 represents an average of the data points between the data used to generate the Conventional and SCPP curves 70 and 72. A regression curve was fit to the average data to derive a power equation used to generate the data at all the runner diameters in the range of 0.020" to 0.130". As this data supports, a runner system for a multi-cavity mold for a substantially constant pressure injection molding system may be designed and manufactured such that the hydraulic runner diameter ($D_H$) of the runner closest to a molding cavity is less than or equal to 20 times a peak melt pressure at which polymer is injected by the injection molding system, divided by $(L/T)^{-1}$, where L/T is a length-to-thickness ratio of a part to be molded in at least one cavity of the multi-cavity molding system, or formulaically:

$$D_H \leq 20 * \text{Peak Melt Pressure}/(L/T)^{-1}$$

The hydraulic diameter of the runner closest to a molding cavity must be sufficiently large so as to permit the flow of molten polymeric material therethrough and into the respective mold cavity. Therefore, there is a practical minimum hydraulic diameter for the runner. This practical minimum is on the order of 0.5 times the gate thickness for the part to be molded. Preferably, the hydraulic runner diameter of the runner closest to a molding cavity is less than or equal to 8.25 times the peak melt pressure, divided by $(L/T)^{-0.889}$ runner diameter, or formulaically:

$$D_H \leq 8.25 * \text{Peak Melt Pressure}/(L/T)^{-0.889}$$

Figure 4:
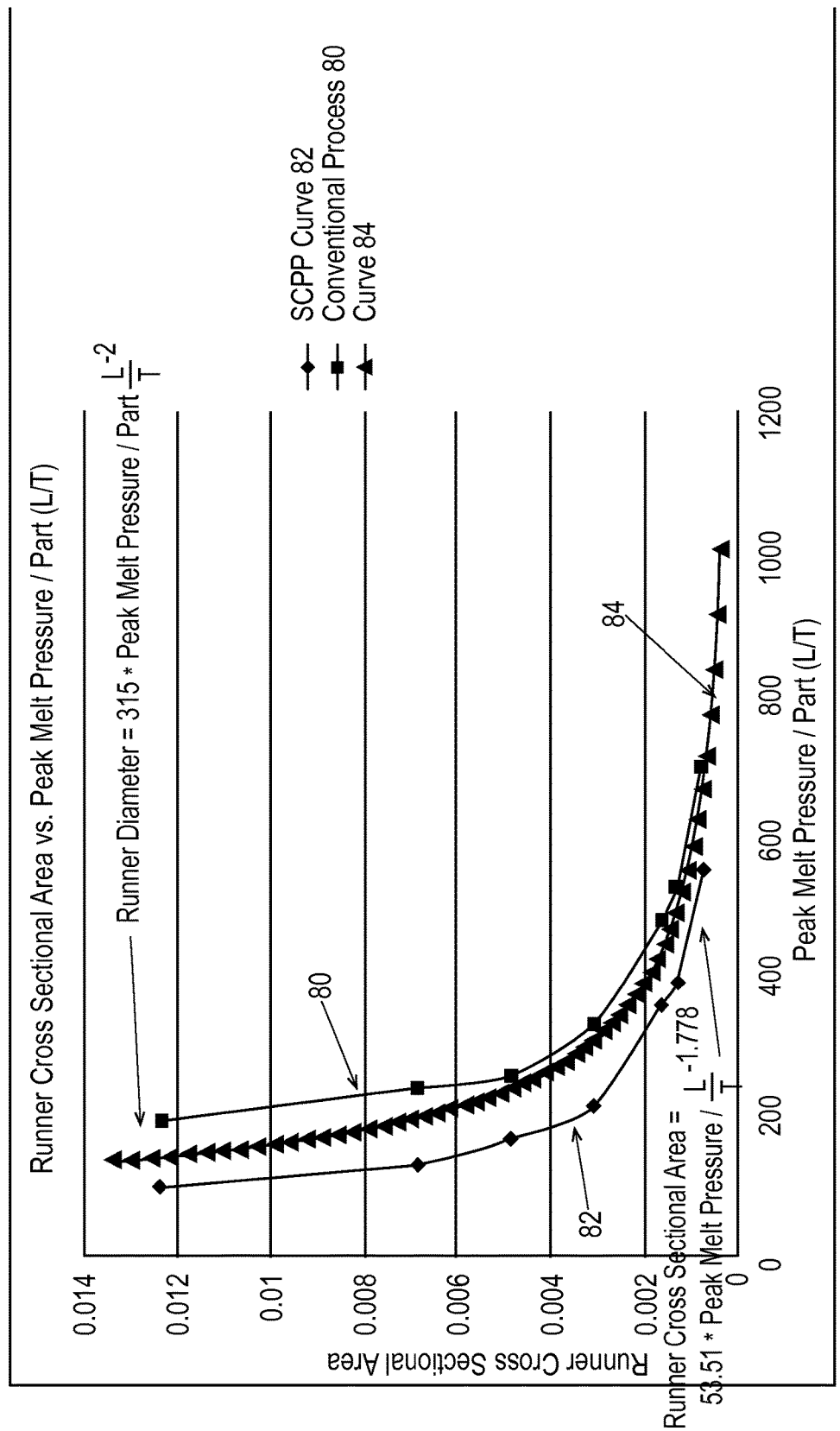
FIG. 4 illustrates a comparison of the relationship of hydraulic runner cross-sectional area to the quotient of peak melt pressure over L/T for a part molded at a substantially constant pressure.

Turning now to FIG. 4, a comparison of the relationship of hydraulic runner cross-sectional area to the quotient of peak melt pressure over L/T for a part is illustrated. The data from which the comparison plot was generated is provided in the following table:

Curve 84

| Cross Sectional Area = 315*Peak Melt Pressure/Part (L/T) | Runner Cross Sectional Area | Curve 82 SCPP | Conventional | Actual Cross Sectional Area |
|---|---|---|---|---|
| 1000.00 | 0.000314159 | 559.76 | 696.30 | 0.000706858 |
| 909.09 | 0.000380133 | 400.31 | 535.32 | 0.001256637 |
| 833.33 | 0.000452389 | 367.86 | 488.22 | 0.001590431 |
| 769.23 | 0.000530929 | 229.72 | 344.47 | 0.003019071 |
| 714.29 | 0.000615752 | 184.56 | 275.11 | 0.004778362 |
| 666.67 | 0.000706858 | 149.58 | 253.17 | 0.006792909 |
| 625.00 | 0.000804248 | 120.33 | 207.94 | 0.012271846 |
| 588.24 | 0.00090792 | | | |
| 555.56 | 0.001017876 | | | |
| 526.32 | 0.001134115 | | | |
| 500.00 | 0.001256637 | | | |
| 476.19 | 0.001385442 | | | |
| 454.55 | 0.001520531 | | | |
| 434.78 | 0.001661903 | | | |
| 416.67 | 0.001809557 | | | |
| 400.00 | 0.001963495 | | | |
| 384.62 | 0.002123717 | | | |
| 370.37 | 0.002290221 | | | |
| 357.14 | 0.002463009 | | | |
| 344.83 | 0.002642079 | | | |
| 333.33 | 0.002827433 | | | |
| 322.58 | 0.003019071 | | | |
| 312.50 | 0.003216991 | | | |
| 303.03 | 0.003421194 | | | |
| 294.12 | 0.003631681 | | | |
| 285.71 | 0.003848451 | | | |
| 277.78 | 0.004071504 | | | |
| 270.27 | 0.00430084 | | | |
| 263.16 | 0.00453646 | | | |
| 256.41 | 0.004778362 | | | |
| 250.00 | 0.005026548 | | | |
| 243.90 | 0.005281017 | | | |
| 238.10 | 0.005541769 | | | |
| 232.56 | 0.005808805 | | | |
| 227.27 | 0.006082123 | | | |
| 222.22 | 0.006361725 | | | |
| 217.39 | 0.00664761 | | | |
| 212.77 | 0.006939778 | | | |
| 208.33 | 0.007238229 | | | |
| 204.08 | 0.007542964 | | | |
| 200.00 | 0.007853982 | | | |
| 196.08 | 0.008171282 | | | |
| 192.31 | 0.008494867 | | | |
| 188.68 | 0.008824734 | | | |
| 185.19 | 0.009160884 | | | |
| 181.82 | 0.009503318 | | | |
| 178.57 | 0.009852035 | | | |
| 175.44 | 0.010207035 | | | |
| 172.41 | 0.010568318 | | | |
| 169.49 | 0.010935884 | | | |
| 166.67 | 0.011309734 | | | |
| 163.93 | 0.011689866 | | | |
| 161.29 | 0.012076282 | | | |
| 158.73 | 0.012468981 | | | |
| 156.25 | 0.012867964 | | | |
| 153.85 | 0.013273229 | | | |

The curve 80, depicted as the "Conventional" curve farthest to the upper right, represents the relationship of hydraulic runner cross-sectional area to [peak melt pressure/(part L/T)] for a conventional injection molding system or process. The curve 82, depicted as the "SCPP" curve farthest to the lower left, represents the relationship of hydraulic runner cross-sectional area to [peak melt pressure/(part L/T)] for a substantially constant injection molding system or process of the present disclosure. The curve 84 intermediate curves 80 and 82 represents an average of the data points between the data used to generate the Conventional and SCPP curves 80 and 82. As this data supports, a runner system for a multi-cavity mold for a substantially constant pressure injection molding system may be designed and manufactured such that the hydraulic runner cross-sectional area of the runner closest to a molding cavity is less than or equal to 315 times a peak melt pressure at which polymer is injected by the injection molding system, divided by $(L/T)^{-2}$, where L/T is a length-to-thickness ratio of a part to be molded in at least one cavity 32 of the multi-cavity molding system, or formulaically:

Hydraulic Cross-Sectional Runner Area≤315*Peak Melt Pressure/$(L/T)^{-2}$

Preferably, the hydraulic runner cross-sectional area of the runner closest to a molding cavity is less than or equal to 53.51 times the peak melt pressure, divided by $(L/T)^{-1.778}$, or formulaically:

Hydraulic Cross-Sectional Runner Area≤53.51*Peak Melt Pressure/$(L/T)^{-1.778}$

Figure 5:
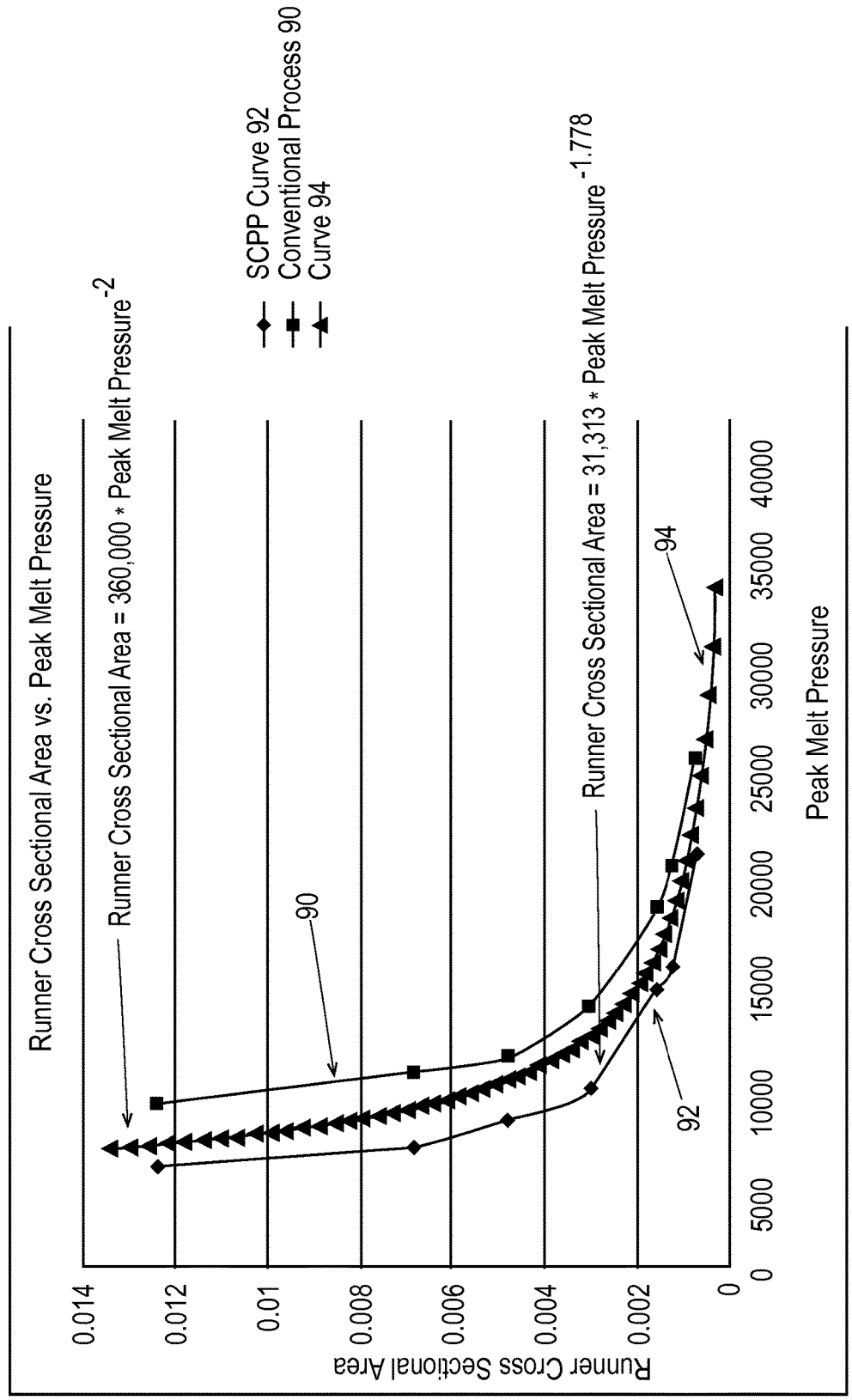
FIG. 5 illustrates a comparison of the relationship of hydraulic runner cross-sectional area to peak melt pressure for a part molded at a substantially constant pressure.

Turning now to FIG. 5, a comparison of the relationship of hydraulic cross-sectional runner area to peak melt pressure is illustrated. The data from which the comparison plot was generated is provided in the following table:

| Runner Cross Sectional Area vs Peak Melt Pressure | | | | |
|---|---|---|---|---|
| Actual Cross Sectional Area Tested (in²) | SCPP Curve 92 | Conventional Pressure | Curve 94 Cross Sectional Area = 360,000* Peak Melt Pressure⁻² | Runner Cross Sectional Area |
| 0.000706858 | 20151.4 | 25066.7 | 33851.37501 | 0.000314159 |
| 0.001256637 | 14410.9 | 19590.5 | 30773.97728 | 0.000380133 |
| 0.001590431 | 13242.6 | 17575.9 | 28209.47918 | 0.000452389 |
| 0.003019071 | 8269.8 | 12401 | 26039.51924 | 0.000530929 |
| 0.004778362 | 6644.9 | 9904.2 | 24179.55358 | 0.000615752 |
| 0.006792909 | 5385.2 | 9114.4 | 22567.58334 | 0.000706858 |
| 0.012271846 | 4331.8 | 7486.3 | 21157.10938 | 0.000804248 |
| | | | 19912.57354 | 0.00090792 |
| | | | 18806.31945 | 0.001017876 |
| | | | 17816.51316 | 0.001134115 |
| | | | 16925.68751 | 0.001256637 |
| | | | 16119.70239 | 0.001385442 |
| | | | 15386.98864 | 0.001520531 |
| | | | 14717.98914 | 0.001661903 |
| | | | 14104.73959 | 0.001809557 |
| | | | 13540.55001 | 0.001963495 |
| | | | 13019.75962 | 0.002123717 |
| | | | 12537.5463 | 0.002290221 |
| | | | 12089.77679 | 0.002463009 |
| | | | 11672.88794 | 0.002642079 |
| | | | 11283.79167 | 0.002827433 |
| | | | 10919.79839 | 0.003019071 |
| | | | 10578.55469 | 0.003216991 |
| | | | 10257.99243 | 0.003421194 |
| | | | 9956.286768 | 0.003631681 |
| | | | 9671.821432 | 0.003848451 |
| | | | 9403.159726 | 0.004071504 |
| | | | 9149.020274 | 0.00430084 |
| | | | 8908.256582 | 0.00453646 |
| | | | 8679.839747 | 0.004778362 |
| | | | 8462.843753 | 0.005026548 |
| | | | 8256.43293 | 0.005281017 |
| | | | 8059.851194 | 0.005541769 |
| | | | 7872.412794 | 0.005808805 |
| | | | 7693.494321 | 0.006082123 |
| | | | 7522.527781 | 0.006361725 |
| | | | 7358.994568 | 0.00664761 |
| | | | 7202.420216 | 0.006939778 |
| | | | 7052.369794 | 0.007238229 |
| | | | 6908.44388 | 0.007542964 |
| | | | 6770.275003 | 0.007853982 |
| | | | 6637.524512 | 0.008171282 |
| | | | 6509.87981 | 0.008494867 |
| | | | 6387.051889 | 0.008824734 |
| | | | 6268.773151 | 0.009160884 |
| | | | 6154.795457 | 0.009503318 |

-continued

| Runner Cross Sectional Area vs Peak Melt Pressure | | | | |
|---|---|---|---|---|
| Actual Cross Sectional Area Tested (in²) | SCPP Curve 92 | Conventional Pressure | Curve 94 Cross Sectional Area = 360,000* Peak Melt Pressure⁻² | Runner Cross Sectional Area |
| | | | 6044.888395 | 0.009852035 |
| | | | 5938.837722 | 0.010207035 |
| | | | 5836.443968 | 0.010568318 |
| | | | 5737.521189 | 0.010935884 |
| | | | 5641.895835 | 0.011309734 |
| | | | 5549.40574 | 0.011689866 |
| | | | 5459.899196 | 0.012076282 |
| | | | 5373.234129 | 0.012468981 |
| | | | 5289.277346 | 0.012867964 |
| | | | 5207.903848 | 0.013273229 |

The curve 90, depicted as the curve farthest to the upper right, represents the relationship of hydraulic runner cross-sectional area to peak melt pressure for a conventional injection molding system or process. The curve 92, depicted as the curve farthest to the lower left, represents the relationship of hydraulic runner cross-sectional area to peak melt pressure for a substantially constant injection molding system or process of the present disclosure. The curve 94 intermediate curves 90 and 92 represents an average of the data points between the data used to generate the Conventional and SCPP curves 90 and 92. As this data supports, a runner system for a multi-cavity mold for a substantially constant pressure injection molding system may be designed and manufactured such that the hydraulic runner cross-sectional area of the runner closest to a molding cavity is less than or equal to the quotient of 360,000 divided by the square of the peak melt pressure, or formulaically:

Hydraulic Cross-Sectional Runner Area≤360,000/(Peak Melt Pressure)²

Preferably, the hydraulic runner cross-sectional area of the runner closest to a molding cavity is less than or equal to 31,313 times (peak melt pressure)$^{-1.778}$, or formulaically:

Hydraulic Cross-Sectional Runner Area≤31,313*(Peak Melt Pressure)$^{-1.778}$

Figure 6:
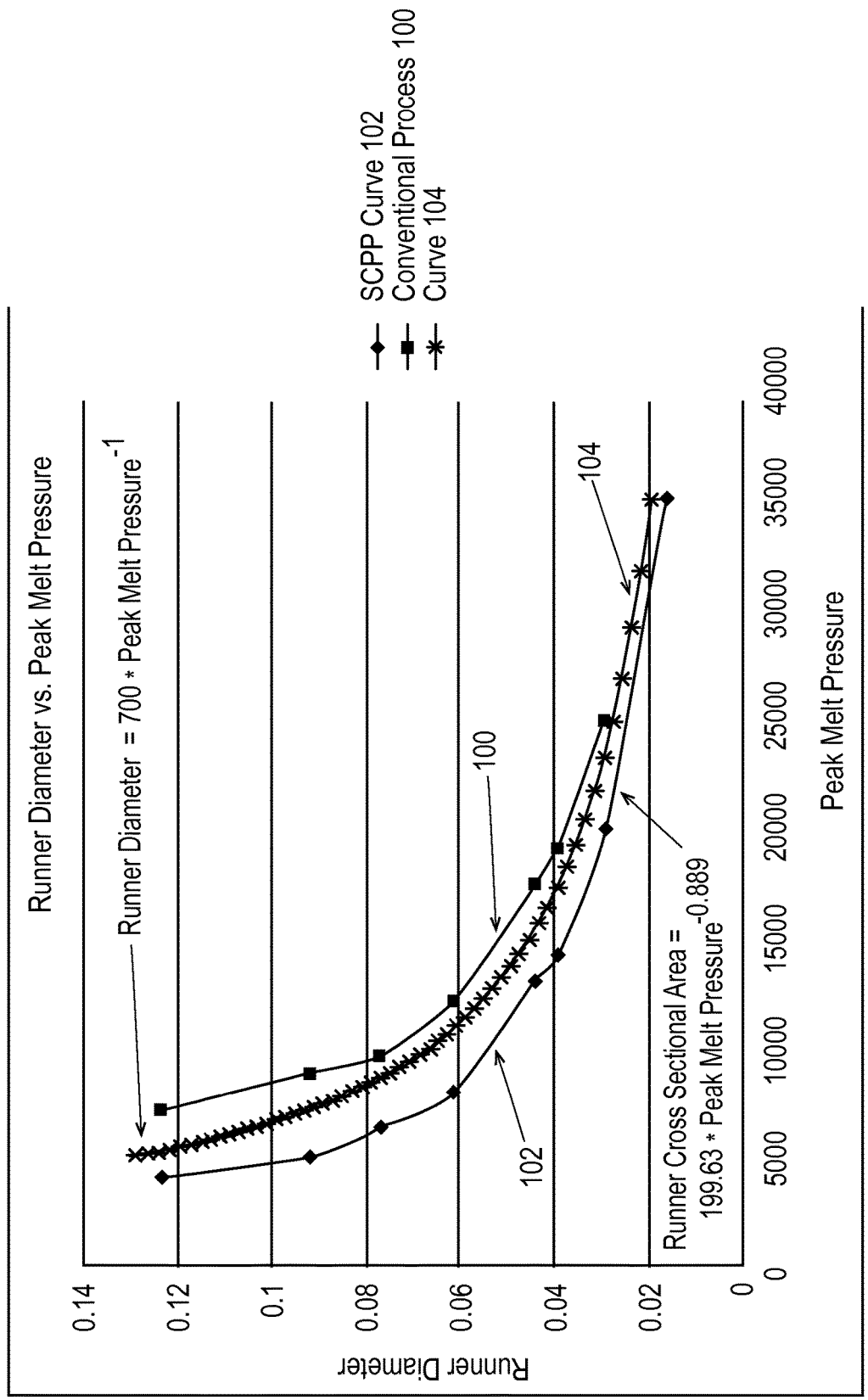
FIG. 6 illustrates a comparison of the relationship of hydraulic runner diameter to peak melt pressure for a part molded at a substantially constant pressure.

Turning to FIG. 6, a comparison of the relationship of hydraulic runner diameter to peak melt pressure is illustrated. The data from which the comparison plot was generated is provided in the following table:

| Runner Diameter vs. Peak Melt Pressure | | | | |
|---|---|---|---|---|
| SCPP Curve 102 | | Conventional | | |
| Runner Diameter (in) | Peak Melt Pressure (psi) | Peak Melt Pressure (psi) | Runner Diameter (in) | Curve 104 Melt Pressure = 700*(Runner Dia)⁻¹ |
| 0.017 | 35000 | — | 0.02 | 35000 |
| 0.03 | 20151.4 | 25066.7 | 0.022 | 31818.18182 |
| 0.04 | 14411 | 19271.6 | 0.024 | 29166.66667 |
| 0.045 | 13243 | 17576 | 0.026 | 26923.07692 |
| 0.062 | 8270 | 12401 | 0.028 | 25000 |
| 0.078 | 6644 | 9904 | 0.03 | 23333.33333 |
| 0.093 | 5385 | 9114 | 0.032 | 21875 |
| 0.125 | 4332 | 7486 | 0.034 | 20588.23529 |
| | | | 0.036 | 19444.44444 |
| | | | 0.038 | 18421.05263 |
| | | | 0.04 | 17500 |
| | | | 0.042 | 16666.66667 |
| | | | 0.044 | 15909.09091 |

-continued

Runner Diameter vs. Peak Melt Pressure

| SCPP Curve 102 | | Conventional | |
|---|---|---|---|
| Runner Diameter (in) | Peak Melt Pressure (psi) | Peak Melt Pressure (psi) | Runner Diameter (in) | Curve 104 Melt Pressure = 700*(Runner Dia)$^{-1}$ |

| Runner Diameter (in) | Melt Pressure |
|---|---|
| 0.046 | 15217.3913 |
| 0.048 | 14583.33333 |
| 0.05 | 14000 |
| 0.052 | 13461.53846 |
| 0.054 | 12962.96296 |
| 0.056 | 12500 |
| 0.058 | 12068.96552 |
| 0.06 | 11666.66667 |
| 0.062 | 11290.32258 |
| 0.064 | 10937.5 |
| 0.066 | 10606.06061 |
| 0.068 | 10294.11765 |
| 0.07 | 10000 |
| 0.072 | 9722.222222 |
| 0.074 | 9459.459459 |
| 0.076 | 9210.526316 |
| 0.078 | 8974.358974 |
| 0.08 | 8750 |
| 0.082 | 8536.585366 |
| 0.084 | 8333.333333 |
| 0.086 | 8139.534884 |
| 0.088 | 7954.545455 |
| 0.09 | 7777.777778 |
| 0.092 | 7608.695652 |
| 0.094 | 7446.808511 |
| 0.096 | 7291.666667 |
| 0.098 | 7142.857143 |
| 0.1 | 7000 |
| 0.102 | 6862.745098 |
| 0.104 | 6730.769231 |
| 0.106 | 6603.773585 |
| 0.108 | 6481.481481 |
| 0.11 | 6363.636364 |
| 0.112 | 6250 |
| 0.114 | 6140.350877 |
| 0.116 | 6034.482759 |
| 0.118 | 5932.20339 |
| 0.12 | 5833.333333 |
| 0.122 | 5737.704918 |
| 0.124 | 5645.16129 |
| 0.126 | 5555.555556 |
| 0.128 | 5468.75 |
| 0.13 | 5384.615385 |

The curve 100, depicted as the "Conventional" curve farthest to the upper right, represents the relationship of hydraulic runner diameter to peak melt pressure for a conventional injection molding system or process. The curve 102, depicted as the "SCPP" curve farthest to the lower left, represents the relationship of hydraulic runner diameter to peak melt pressure for a substantially constant injection molding system or process of the present disclosure. The curve 104 intermediate curves 100 and 102 represents an average of the data points between the data used to generate the Conventional and SCPP curves 100 and 102. As this data supports, a runner system for a multi-cavity mold for a substantially constant pressure injection molding system may be designed and manufactured such that the hydraulic runner diameter of the runner closest to a molding cavity is less than or equal to 700 divided by the peak melt pressure, or formulaically:

$$D_H \leq 700 * \text{Peak Melt Pressure}^{-1}$$

Preferably, the hydraulic runner diameter of the runner closest to a molding cavity is less than or equal to 199.63 times the peak melt pressure$^{-0.889}$, or formulaically:

$$D_H \leq 199.63 * \text{Peak Melt Pressure}^{-0.889}$$

In a multi-branch, multi-cavity injection molding system of the present disclosure, it is also found that for a hot runner manifold, even when operating at substantially constant pressure, there is some pressure drop from the inlet of the feed system to the outlet of the feed system. As mentioned above, by running at substantially constant pressures (as opposed to variable peak pressures), it is found that the runner size may be reduced, resulting in significant benefits. A particular benefit of reduced runner size in a hot runner system is that a frequent concern when operating a hot runner system is the fact that because molten polymeric material is compressible, there is some lag or hysteresis after stopping actuation of the reciprocating screw 22 (or plunger) of the injection molding system, after which the momentum of the still-molten polymeric material, and release of potential energy due to compression, cause that material to continue to flow toward the mold cavities. The larger the volume of the runners, the more pronounced this continued flow following screw or plunger stoppage phenomenon. Conversely, by reducing the size of the runners in a hot runner system, the effects of continued molten polymeric material flow following stoppage of the reciprocating screw 22 or plunger are abated.

When designing a hot runner system according to the formula $D_m = D_b * N^{1/3}$, where N equals the number of branches extending from a node. Using this formula, the sum of the cross sectional area of the final runner branches [$A_b$] is substantially higher than the cross sectional area at the feed system inlet or the main sprue [$A_m$]. The relationship of $D_m$ to $D_b$ can further be expressed by the formula $D_m = D_b * [\text{the total number of final runners}]^{1/3}$. This relationship holds true regardless of the number of final runner branches, so long as the runner sizes are determined using the formula $D_m = D_b * N^{1/3}$ as discussed above. Based on this relationship, it can further be determined that the ratio of $A_b$ to $A_m$ will always follow the proportions shown in the table below, where $D_b$ is shown for a 6 millimeter system and for a 3 millimeter system to illustrate that the relationship always holds. Therefore, a system having a hot runner in closest proximity to a mold cavity with a minimum hydraulic diameter at least sufficiently large so as to permit the flow of molten polymeric material therethrough and into the mold cavity, and less than 6 millimeters, is achievable with the substantially constant pressure injection molding process of the present disclosure. $A_m$ and $A_b$ are hydraulic cross sectional areas. Two tables are shown below. Table 2 involves the conventional minimum final hot runner hydraulic diameter of 6 mm for thermoplastic materials. Table 3 provides one example of a smaller final runner hydraulic diameter made possible constant pressure processing using thermoplastic materials.

TABLE 2

| # of Final Runners | $D_{main}$* | $A_m$ | $A_b$ | Ab/Am Ratio |
|---|---|---|---|---|
| 4 | 9.52 | 71.211 | 113.040 | 1.587 |
| 8 | 12.00 | 113.040 | 226.080 | 2.000 |
| 16 | 15.12 | 179.440 | 452.160 | 2.520 |
| 32 | 19.05 | 284.843 | 904.320 | 3.175 |
| 64 | 24.00 | 452.160 | 1808.640 | 4.000 |
| 128 | 30.24 | 717.759 | 3617.280 | 5.040 |
| 256 | 38.10 | 1139.372 | 7234.560 | 6.350 |

*Assumes a 6 millimeter final runner diameter.

TABLE 3

| # of Final Runners | $D_{main}$** | $A_m$ | $A_b$ | Ab/Am Ratio |
|---|---|---|---|---|
| 4 | 4.76 | 17.803 | 28.260 | 1.587 |
| 8 | 6.00 | 28.260 | 56.520 | 2.000 |
| 16 | 7.56 | 44.860 | 113.040 | 2.520 |
| 32 | 9.52 | 71.211 | 226.080 | 3.175 |
| 64 | 12.00 | 113.040 | 452.160 | 4.000 |
| 128 | 15.12 | 179.440 | 904.320 | 5.040 |
| 256 | 19.05 | 284.843 | 1808.640 | 6.350 |

**Assumes a 3 millimeter final runner diameter.

The use of constant pressure processing enables this ratio to be reduced, which in turn reduces the pressure loss that will occur in the feed system. This is possible, since a mold cavity can be filled at a substantially lower flow rate, and thus polymer can be forced through the feed system at much lower pressures according to Bernoulli's Principle. This ratio can be reduced, such that the ratio of $A_b$ to $A_m$ is lower than the standard ratio applied in the table above. For example, if a 3 millimeter final runner diameter is used, while maintaining the main runner diameter the same as for a standard 6 millimeter final runner system, then the resulting $A_b$ to $A_m$ ratio is shown in the table below.

TABLE 4

| # of Final Runners | $A_b/A_m$ Ratio*** |
|---|---|
| 4 | 0.397 |
| 8 | 0.500 |
| 16 | 0.630 |
| 32 | 0.794 |
| 64 | 1.000 |
| 128 | 1.260 |
| 256 | 1.587 |

***Where $A_b$ is for a 3 millimeter final runner diameter, and $A_m$ is calcucated for a main runner diameter for a system having a 6 mm final runner using the formula $D_m = D_b * N^{1/3}$.

This demonstrates that a runner system can be designed such that there is considerably less pressure loss across the runner network when a substantially constant pressure process is used. Based on the experimental data shared in Table 1, above, the ratio of $A_b/A_m$ in Table 4 can be reduced to 1:1, or even less. Thus, a runner system for a substantially constant pressure process can be designed such that reduced pressure loss contribution occurs across the runner network as a result of an increase in cross-sectional flow area. It is understood that some losses may occur related to the frictional losses in the system, and also that shear thinning behaviors of the flowing liquid will also affect the pressure required to flow through the system. However, the relationship associated with the cross sectional hydraulic flow diameters shown above will continue to be true regardless of these other factors.

For a multi-branch, multi-cavity substantially constant pressure injection molding system having a system of hot runners arranged as a system of feeder channels or runners 60 such as illustrated schematically in FIG. 2, it is found that the hot runner system may be designed and manufactured such that the cross-sectional area of the main runner 68 is equal to the cross-sectional area of each of the runners 64 in the first runner branch set of runners in closest proximity to a plurality of mold cavities 32, times a constant K, or formulaically:

$$A_{main} = A_{final\ branch} * K$$

Where $A_{main} = \pi(D_{H\ main}/2)^2$ and $$A_{final\ branch} = \pi(D_{H\ final\ branch}/2)^2$$

the formula becomes $\pi(D_{H\ main}/2)^2 = \pi(D_{H\ final\ branch}/2)^2 * K$, which simplifies to: $D_{H\ main}^2 = D_{H\ final\ branch}^2 * K$ As discussed in U.S. patent application Ser. No. 13/476,073, entitled "Non-Naturally Balanced Feed System for an Injection Molding Apparatus", the entire disclosure of which is incorporated herein by reference, it is possible to provide flow channels or runner systems in an asymmetric pattern between nozzle 26 and gates 30. Another benefit of the reduced-runner sizes contemplated by the present disclosure is the ability to optimize the distribution of multiple mold cavities in a single mold by combining the benefits of a non-naturally balanced feed system with feed channels of reduced hydraulic diameter or cross-section as compared to conventional injection molding systems.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

It should now be apparent that the various embodiments of the products illustrated and described herein may be produced by a substantially constant pressure molding process. While particular reference has been made herein to products for containing consumer goods or consumer goods products themselves, it should be apparent that the molding method discussed herein may be suitable for use in conjunction with products for use in the consumer goods industry, the food service industry, the transportation industry, the medical industry, the toy industry, and the like. Moreover, one skilled in the art will recognize the teachings disclosed herein may be used in the construction of stack molds, multiple material molds including rotational and core back molds, in combination with in-mold decoration, insert molding, in mold assembly, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A runner system for an injection molding machine for a thermoplastic material, the runner system comprising a plurality of runner branches including a plurality of final runner branches, with each of the final runner branches connecting through a gate and into one of one or more mold cavities of the injection molding machine, wherein:
  at least one mold cavity, of the one or more mold cavities, is configured to mold a part which has a particular gate thickness, which is a wall thickness of the part; and
  at least one final runner branch, of the final runner branches connecting into the at least one mold cavity through the gate, has a hydraulic diameter that is 0.5-0.9 times the particular gate thickness.

2. The runner system of claim 1, wherein the at least one mold cavity is configured to mold the part, which has a length to thickness ratio that is greater than 100.

3. The runner system of claim 2, wherein the at least one mold cavity is configured to mold the part, which has a particular average thickness that is less than about 10 millimeters.

4. The runner system of claim 1, wherein:
  the mold cavity is included in a plurality of mold cavities for the injection molding machine;
  at least one of the final runner branches connects into each of the mold cavities;
  each of the mold cavities is configured to mold a part, which has a particular gate thickness, which is a wall thickness of the part at the gate for that mold cavity; and
  for each of the mold cavities, the at least one final runner branch that connects into that mold cavity through its gate has a hydraulic diameter that is 0.5-0.9 times the particular gate thickness for that mold cavity.

5. The runner system of claim 4, wherein each of the mold cavities is configured to mold the part, which has a length to thickness ratio that is greater than 100.

6. The runner system of claim 5, wherein each of the mold cavities is configured to mold the part, which has an average thickness that is less than about 10 millimeters.

* * * * *